United States Patent
Sergyeyenko et al.

(10) Patent No.: US 6,964,106 B2
(45) Date of Patent: Nov. 15, 2005

(54) LASER LEVEL

(75) Inventors: Oleksiy P. Sergyeyenko, Brockville (CA); James D. Marshall, Mallorytown (CA); David M. Shaver, Brockville (CA); Stefano F. DeCecco, Ottawa (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/776,756

(22) Filed: Feb. 11, 2004

(65) Prior Publication Data

US 2005/0172502 A1    Aug. 11, 2005

(51) Int. Cl.[7] ............................. G01C 9/12; G01C 15/10
(52) U.S. Cl. ............................................. 33/286; 33/291
(58) Field of Search ......................... 33/286, 281, 282, 33/283, 285, 290, 291, 391, 397, DIG. 1, 33/675

(56) References Cited

U.S. PATENT DOCUMENTS

| | | | | |
|---|---|---|---|---|
| 3,241,243 A | * | 3/1966 | Speer | 33/675 |
| 5,539,990 A | * | 7/1996 | Le | 33/283 |
| 5,912,733 A | * | 6/1999 | Dunlop et al. | 33/286 |
| 6,792,685 B1 | * | 9/2004 | Ng et al. | 33/286 |
| 2003/0029049 A1 | * | 2/2003 | Huang et al. | 33/286 |

* cited by examiner

*Primary Examiner*—Christopher W. Fulton
(74) *Attorney, Agent, or Firm*—Wesley W. Muller; Bruce S. Shapiro; Jonathon Yun

(57) ABSTRACT

An improved laser level has a housing and a first shaft connected to the housing. Two bearings are disposed on the first shaft. A gimbal body is disposed on the two bearings. A second shaft is connected to the gimbal body. A third bearing is disposed on the second shaft. A pendulum is disposed on the third bearing. A laser diode is disposed on the pendulum.

8 Claims, 3 Drawing Sheets

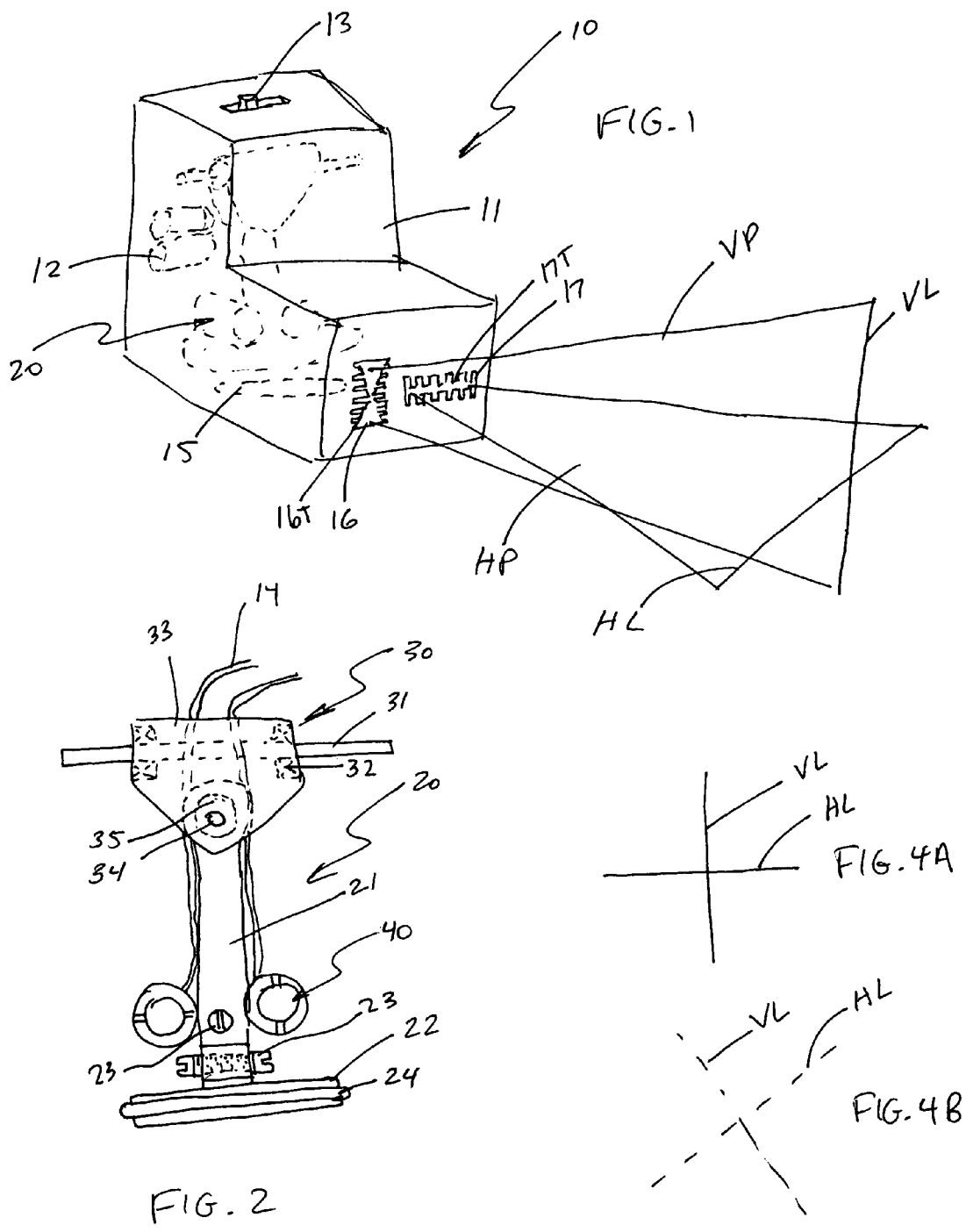

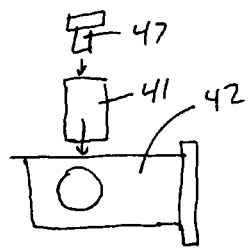
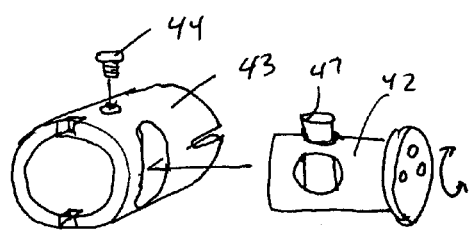
FIG. 3A   FIG. 3B
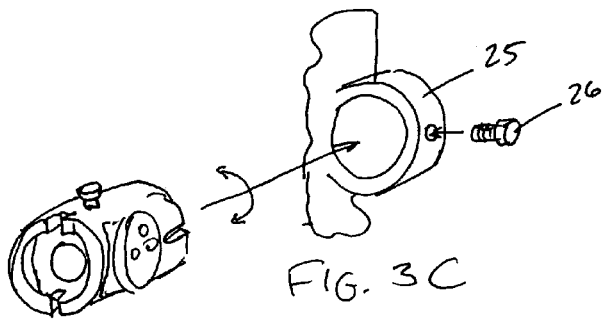
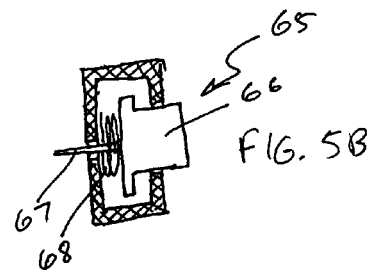
FIG. 3C   FIG. 5B
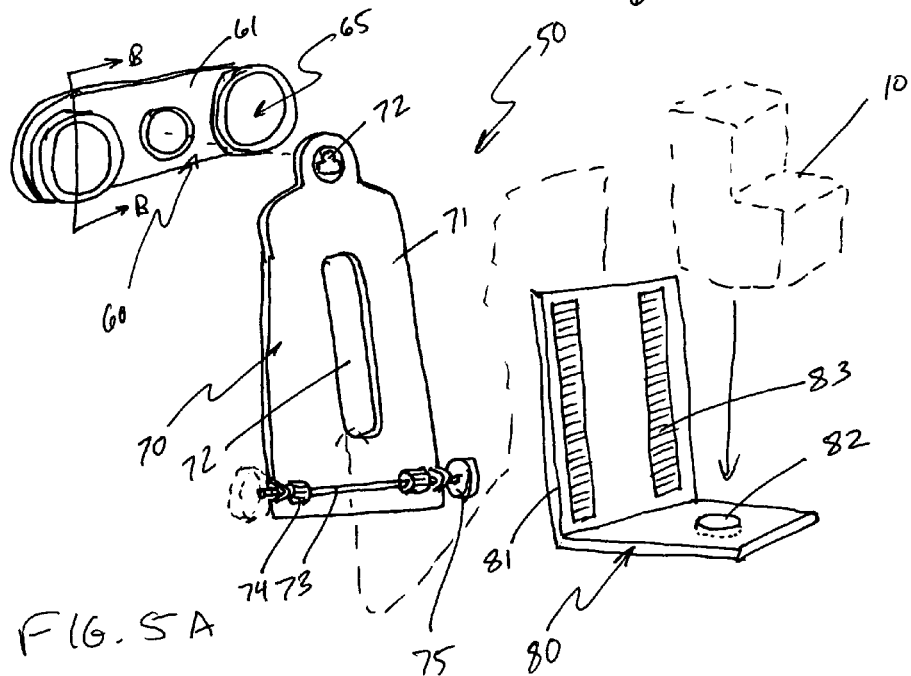
FIG. 5A

LASER LEVEL

FIELD OF THE INVENTION

This invention relates generally to laser levels and more specifically to a laser level which generates a laser line on a surface.

BACKGROUND OF THE INVENTION

U.S. Pat. No. 5,539,990, which is wholly incorporated herein by reference, disclosesan optical levelling, plumbing and angle-calibrating instrument including a frame, a plumb body universally pendulously mounted on the frame and defining a vertical plumb line gravitationally, at least an illuminator electrically connected to a power supply and mounted on the plumb body for emitting laser light, and at least a cylindrical-surfaced lens mounted on the plumb body in front of the illuminator for planarly diverging the laser light as emitted from the illuminator through the lens to form a laser light plane transverse to a lens axis of the cylindrical-surfaced lens, whereby the laser light plane will projectively intersect an objective wall to form a straight line of optical image, serving as a reference line for levelling or plumbing use. Such laser level may be difficult to install on a wall, etc.

It is an object of the present invention to provide a laser level that is inexpensive and usable by the general public in multiple applications.

SUMMARY OF THE INVENTION

In accordance with the present invention, an improved laser level is employed. The laser level has a housing, a first shaft connected to the housing, first and second bearings disposed on the first shaft, a gimbal body disposed on the first and second bearings, a second shaft connected to the gimbal body, a third bearing disposed on the second shaft, a pendulum disposed on the third bearing, and a laser diode disposed on the pendulum.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 1 is a perspective view of the laser level according to the invention;

FIG. 2 is a front view of the pendulum assembly according to the invention;

FIG. 3 illustrates a method of assembling the pendulum assembly, where FIGS. 3A–3C illustrate different steps in chronological order;

FIG. 4 illustrates the lines generated by the laser level, where FIGS. 4A–4B illustrate the lines when the laser level is within and without self-leveling range, respectively;

FIG. 5 illustrates a first embodiment of a wall mount assembly, where FIG. 5A is an exploded view of the wall mount assembly, and FIG. 5B is a partial cross-sectional view along line B—B of FIG. 5A.

DETAILED DESCRIPTION

Figure 6:
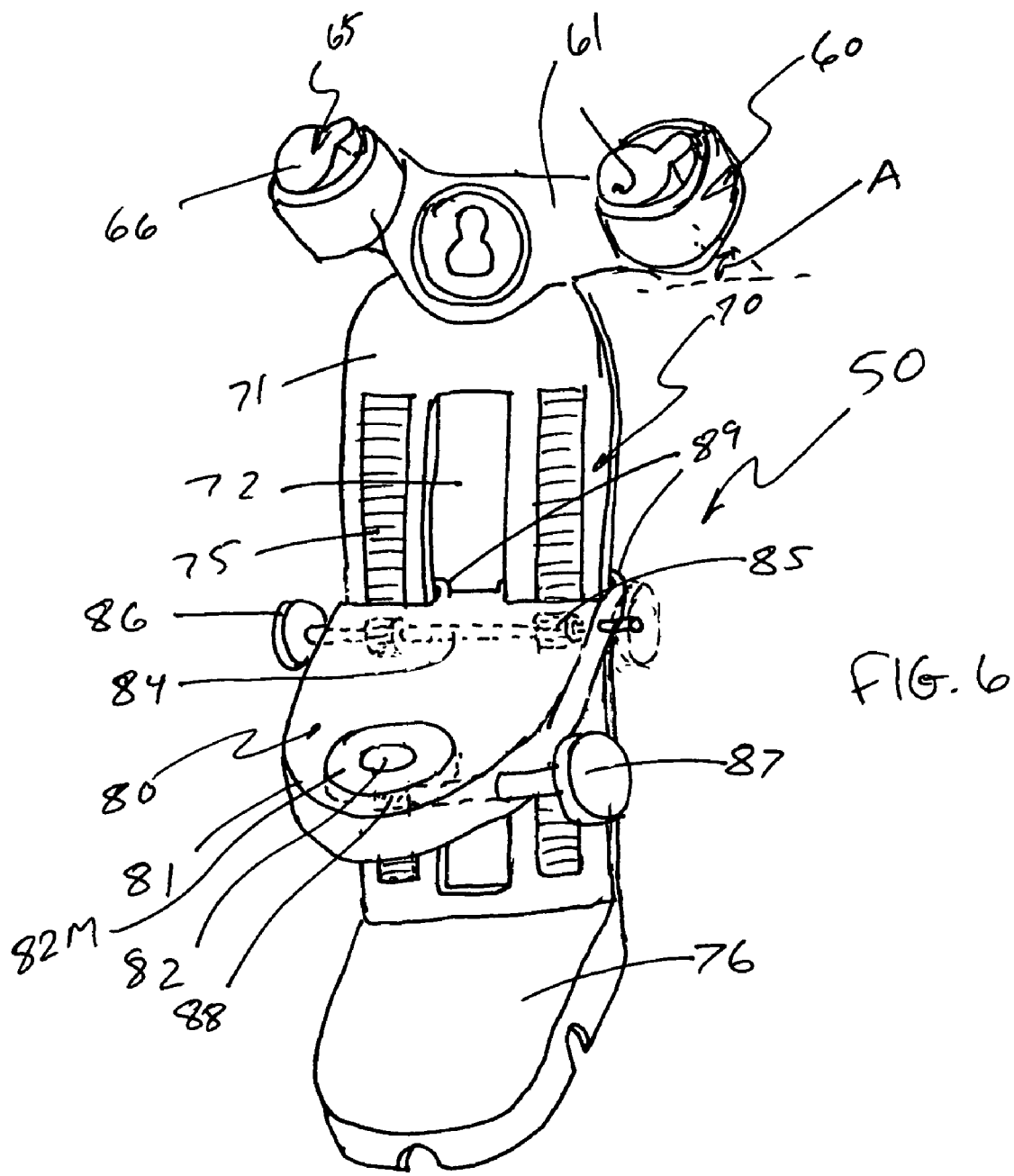
FIG. 6 illustrates a second embodiment of the wall mount assembly.

The invention is now described with reference to the accompanying figures, wherein like numerals designate like parts. Referring to FIGS. 1–2, a laser level 10 may have a housing 11, a pendulum assembly 20 hung inside the housing 11, and two line generating laser assemblies 40 disposed on the pendulum assembly 20. Each laser assembly 40 preferably generates a laser light plane so that, upon contact with a surface, such as a wall, a laser line is generated on the surface.

Preferably, one of the laser assemblies 40 is aligned so that it generates a horizontal planar beam HP, so that a horizontal line HL appears on the surface. Similarly, the other laser assembly 40 may be aligned to generate a vertical planar beam VP, so that a vertical line VL appears on the surface.

Persons skilled in the art will recognize that, because the laser assemblies 40 are mounted on pendulum assembly 20, the laser level 10 will self-level, generating truly horizontal and/vertical lines. Persons skilled in the art should refer to U.S. Pat. No. 5,539,990, which is wholly incorporated herein by reference, for further information.

Laser assemblies 40 may be powered by at least one battery 12 mounted in housing 11. Persons skilled in the art will recognize that battery 12 may alternatively be mounted on pendulum assembly 20.

A switch 13 may connected to battery 12 and the laser assemblies 40 via wires 14. Switch 13 may be used to control whether one or both lasers assemblies 40 are turned on, thus projecting horizontal and/or vertical lines unto the surface.

Pendulum assembly 20 may include a pendulum body 21, which supports the laser assemblies 40.

Pendulum assembly 20 may be pivotally mounted to the housing 11 via a three-bearing gimbal assembly 30. Such assembly may include a main axle 31 attached to the housing 11. Two bearings 32 may be rotatably disposed on the main axle 31. A gimbal body 33 may be disposed on the bearings 32. Gimbal body 33 may a pendulum axle 34. Another bearing 35 may be rotatably disposed on the pendulum axle 34. The pendulum body 21 is then disposed on the bearing 35. Persons skilled in the art should recognize that the two bearings 32 may be disposed on pendulum axle 34, whereas the bearing 35 can be disposed on the main axle 31. Persons skilled in the art will recognize that such arrangement is advantageous because it provides a two-axis rotational system with only three bearings, as opposed to the typical four-bearing gimbal.

Pendulum body 21 may threadingly receive at least one set screw 23 to ensure or proper balancing of the pendulum assembly 20. During assembly, set screw 23 would be rotated to provide the proper balance, and then fixed in position with a locking compound, such as Loc-Tite, etc.

Pendulum body 21 may also have a bottom plate 22. An O-ring 24 may be provided on the bottom plate 22 to deaden any vibrating, and thus limit rattling of the pendulum assembly 20. Bottom plate 22 may magnetically interact with a magnet 15 disposed in housing 11 for magnetically damping pendulum assembly 20, as is well known in the art.

Referring to FIGS. 2–3, pendulum body 21 may have barrel holders 25 for the laser assemblies 40.

The laser assemblies 40 may be assembled as follows. First, a cylindrical or other line lens 41 is preferably inserted into a lens holder 42. The 41 lens is held in lens holder 42 by a set screw 47. The lens holder 42 is then inserted into the laser barrel 43, which carries the laser diode (not shown).

Persons skilled in the art will recognize that laser barrel 43 may also carry a collimating lens (not shown) for collimating the beam emitted by the laser diode.

The lens holder 42 is rotated about its longitudinal axis to eliminate line crowning. The lens holder 42 is then held in place by a set screw 44. The laser barrel 43 is then inserted into the barrel holder 25. The laser barrel 43 is rotated about its longitudinal axis to the appropriate orientation. The laser barrel 43 is then held in place by a set screw 26. Persons skilled in the art will recognize that it is preferable to fix the set screws 44, 47 and/or 26 in position with a locking compound, such as Loc-Tite, etc.

Referring to FIGS. 1 and 4, the housing 11 has two exit windows 16, 17 with teeth 16T, 17T for indicating when the laser level 10 is out of self-leveling range. FIG. 4A shows the laser cross generated by the laser level 10 when pendulum assembly 20 (and thus laser level 10) are within self-leveling range. If the housing 11 is tilted beyond the self-leveling range, the pendulum body 21 will not be able to move to the substantially vertical position in order to generate a truly horizontal and/or vertical line. In this situation, the teeth 16T and/or 17T will break the laser lines into dashed lines, as shown in FIG. 4B. This will indicate to the user that the laser level 10 is out of the self-leveling range. Persons skilled in the art will recognize that such arrangement will provide a visual indication of the out-of-self-leveling-range condition without requiring any additional electronic circuitry, as is found in typical pendulum-based line generators.

Referring to FIG. 5, the laser level 10 can be mounted on a wall mount assembly 50, which in turn is mounted on a wall. The wall mount assembly 50 may have three components: (1) a pin plate assembly 60; (2) an intermediate plate assembly 70 pivotally attached to the pin plate assembly 60; and (3) a table body assembly 80 slidingly attached to the intermediate plate assembly 70.

The pin plate assembly 60 may have a plate body 61 and two retractable pin assemblies 65 mounted on plate body 61. The pin assembly 65 may include a button 66 trapped within the plate body 61. Button 66 may carry a pin 67. The button 66 is biased outwardly (and away from the wall) by a spring 68. With such arrangement, a user can easily fix the wall mount assembly 50 unto the wall by placing the wall mount assembly 50 on the wall and pushing buttons 66, thus pushing the pins 67 into the wall.

As mentioned above, the intermediate plate assembly 70 may be pivotally attached to the pin plate assembly 60. Persons skilled in the art will recognize that any pivotable connection may be used between the pin and intermediate plate assemblies 60, 70. The intermediate plate assembly 70 may have an intermediate plate body 71.

Intermediate plate body 71 may have a key hole 72 for hanging the wall mount from a nail in the wall. Persons skilled in the art will recognize that such arrangement provides an alternate method of installing the wall mount assembly 50 on the wall. Preferably, the key hole 72 is disposed on the rotational axis of the intermediate plate assembly 70 relative to pin plate assembly 60.

Intermediate plate body 71 may have a slot 72.

The table body assembly 80 may be slidingly attached to the intermediate plate assembly 70. Table body assembly 80 may have a table body 81. Table body 81 may have fingers (not shown) which engage intermediate plate body 71 and/or slot 72.

The table body assembly 80 may also have a magnet 82 for supporting the laser level 10. Preferably, magnet 82 magnetically engages magnet 15. Magnet 82 is preferably a weak magnet so that it does not disturb the oscillation range of pendulum body 21. Persons skilled in the art that magnet 82 may also be a ferrous material that can magnetically engage magnet 15.

The intermediate plate body 71 may support a shaft 73, which in turn supports at least one pinion (and preferably 2 pinions) 74. Shaft 73 may also have at least one knob (and preferably 2 knobs) 75. Pinion 74 meshes with racks 83 on the table body 81. Persons skilled in the art will recognize that table body 81 is received between intermediate plate body 71 and shaft 73. Because of such arrangement, the user can change the vertical position of the table body 81 (and thus of laser level 10) relative to the intermediate plate body 71 by rotating the knobs 75.

Persons skilled in the art will recognize that it is preferable to provide at least one enlarged tooth at the end of rack 75 to limit the movement range of table body 81. Preferably, the movement range of table body 81 is limited so that, in the uppermost position, laser level 10 will project a horizontal line through the center of key hole 72 and/or pin assemblies 65 (if the plate body 61 is substantially horizontal).

A second embodiment of the wall mount assembly 50 is shown in FIG. 6, where like numerals refer to like parts. The teachings of the previous embodiment are incorporated herein by references. As before, the wall mount assembly 50 has pin and intermediate plate assemblies 60, 70.

Pin assemblies 65 are preferably inclined downwardly, i.e., at an angle from a horizontal plane, to increase holding capacity. Angle A is between about 5 degrees and about 89 degrees, and is preferably about 15 degrees.

Button 66 may have a tab (not shown) that engages another tab in the pin plate body 61 when the button 66 is rotated and pushed towards the wall, for locking the button 66 (and pin 67) in place.

As before, table body assembly 80 is slidably attached to the intermediate plate body 71. The table body 81 may have fingers 89 which engage intermediate plate body 71 and/or slot 72.

Table body 81 may support a shaft 84, which in turn supports at least one pinion (and preferably 2 pinions) 85. Shaft 84 may also have at least one knob (and preferably 2 knobs) 86. Pinion 85 meshes with racks 75 disposed on the intermediate plate body 71. Because of such arrangement, the user can change the vertical position of the table body 81 (and thus of laser level 10) relative to the intermediate plate body 71 by rotating the knobs 86. Persons skilled in the art will recognize that it is preferable to provide at least one enlarged tooth at the end of rack 75 to limit the movement range of table body 81.

Table body 81 may have a magnet 82 as in the previous embodiment. Magnet 82 may be mounted unto mount 82M. Magnet 82 and/or mount 82M may be rotatably attached to table body 81. Magnet 82 and/or mount 82M may have gears (not shown) on its circumference. These gears engage a worm gear 88 which is rotatable by the user via knob 87. Accordingly, the user can change the orientation of laser level 10 when mounted unto table body 81 without touching laser level 10, by just rotating knob 87.

Persons skilled in the art will recognize that it may be preferable to provide the intermediate plate assembly 70 with a horizontal base 76 connected to intermediate plate body 71 so that the wall mount assembly 50 (and thus laser level 10) can be disposed on a floor or horizontal surface.

Persons skilled in the art may recognize other additions or alternatives to the means disclosed herein. However, all these additions and/or alterations are considered to be equivalents of the present invention.

We claim:

1. A laser level comprising:
   a housing having a first opening;
   a pendulum pivotably connected to the housing;
   a first laser diode disposed on the pendulum; and
   a first line lens for converting a laser beam emitted by the first laser diode into a first planar beam exiting through the first opening;
   wherein the housing is movable between a first position where the pendulum is within self-leveling range and a second position where the pendulum is outside the self-leveling range, and the first opening having at least one protrusion where, in the first position, the at least one protrusion does not obstruct the first planar beam and, in the second position, the at least one protrusion partially obstructs the first planar beam.

2. The laser level of claim 1, further comprising a second laser diode disposed on the pendulum, and a second line lens for converting a laser beam emitted by the second laser diode into a second planar beam exiting through a second opening in the housing.

3. The laser level of claim 2, wherein the second opening having at least one protrusion where, in the first position, the at least one protrusion does not obstruct the second planar beam and, in the second position, the at least one protrusion partially obstructs the second planar beam.

4. The laser level of claim 1, wherein said first opening further comprises two angled sides.

5. The laser level of claim 4, wherein said at least one protrusion is disposed on at least one of said two angled sides.

6. The laser level of claim 4, wherein said angled sides have an angle of inclination substantially the same as an initial out of range angle between the pendulum and the housing.

7. The laser level of claim 1, wherein said first opening further comprises upper and lower sides.

8. The laser level of claim 7, wherein said at least one protrusion is disposed on at least one of said upper and lower sides.

* * * * *